US012763683B2

(12) United States Patent
Wiggers

(10) Patent No.: US 12,763,683 B2
(45) Date of Patent: Oct. 13, 2026

(54) CIRCUIT ASSEMBLY FOR A SWITCHED-MODE POWER SUPPLY OF AN ELECTRIC AUXILIARY DEVICE AT THE SITE OF A CONNECTED ELECTRIC LOAD, BUILDING DATA PROCESSING DEVICE, SOCKET MODULE, AND ELECTRIC STAIRWELL INSTALLATION

(71) Applicant: BEENIC BUILDINGS INTELLIGENCE GMBH, Greifswald (DE)

(72) Inventor: Rainer Wiggers, Neubrandenburg (DE)

(73) Assignee: BEENIC BUILDINGS INTELLIGENCE GMBH, Greifswald (DE)

( * ) Notice: Subject to any disclaimer, the term of this patent is extended or adjusted under 35 U.S.C. 154(b) by 0 days.

(21) Appl. No.: 18/691,600

(22) PCT Filed: Aug. 30, 2022

(86) PCT No.: PCT/EP2022/074128
§ 371 (c)(1),
(2) Date: Mar. 13, 2024

(87) PCT Pub. No.: WO2023/041324
PCT Pub. Date: Mar. 23, 2023

(65) Prior Publication Data

US 2025/0132669 A1 Apr. 24, 2025

(30) Foreign Application Priority Data

Sep. 14, 2021 (DE) ..................... 20 2021 104 945.6
May 10, 2022 (DE) ..................... 10 2022 111 694.8

(51) Int. Cl.
*H02M 7/46* (2006.01)
*H02M 3/155* (2006.01)
*H05B 45/3725* (2020.01)

(52) U.S. Cl.
CPC ........ *H02M 3/155* (2013.01); *H05B 45/3725* (2020.01)

(58) Field of Classification Search
CPC ........................... H02M 3/155; H05B 45/3725
See application file for complete search history.

(56) References Cited

U.S. PATENT DOCUMENTS 10,966,306 B1 * 3/2021 Recker .................. H05B 45/20
2009/0102296 A1 * 4/2009 Greene .................. H01Q 1/243
307/149

(Continued)

FOREIGN PATENT DOCUMENTS

DE 202017005523 U1 12/2017
DE 202021101687 U1 5/2021
EP 3629677 A1 4/2020

OTHER PUBLICATIONS

International Search Report and Written Opinion mailed Jan. 5, 2023 in related/corresponding International Application No. PCT/EP2022/074128.
Office Action created May 19, 2022 in related/corresponding DE Application No. 10 2022 111 694.8.
Search Report created Mar. 16, 2022 in related/corresponding DE Application No. 20 2021 104 945.6.

*Primary Examiner* — Ryan Johnson
*Assistant Examiner* — Esayas G Yeshaw
(74) *Attorney, Agent, or Firm* — PATENT PORTFOLIO BUILDERS PLLC

(57) ABSTRACT

A circuit assembly is provided for a switched-mode power supply of an electric auxiliary device at the site of a connected electric load located in a power circuit in which a switch element switches the operating state of the load with low losses while the auxiliary device is permanently supplied with electric energy. The circuit assembly has a (Continued)

bridge component arranged in a parallel circuit with respect to the switch element, and a support component connected upstream of the load such that the load is supplied with power on the basis of the switch position of the switch element, and at least one auxiliary device arranged between the bridge component and the support component and which is supplied with power without interruption regardless of the switch position of the switch element. The bridge component has a cyclically conductive switch element, and the support component has a anti-cyclically conductive switch element and a storage element.

17 Claims, 6 Drawing Sheets

(56) References Cited

U.S. PATENT DOCUMENTS

| | | | | |
|---|---|---|---|---|
| 2013/0063051 | A1 | 3/2013 | Sterling et al. | |
| 2014/0111101 | A1* | 4/2014 | McRae | H05B 45/20 315/186 |
| 2014/0265880 | A1* | 9/2014 | Taipale | H05B 45/10 315/246 |
| 2015/0108904 | A1* | 4/2015 | Chen | H05B 47/195 315/210 |
| 2016/0336797 | A1* | 11/2016 | Dahlen | H05B 47/175 |
| 2018/0034365 | A1* | 2/2018 | Sicard | H02M 1/08 |
| 2022/0255544 | A1* | 8/2022 | Chen | H05B 47/19 |

* cited by examiner

CIRCUIT ASSEMBLY FOR A SWITCHED-MODE POWER SUPPLY OF AN ELECTRIC AUXILIARY DEVICE AT THE SITE OF A CONNECTED ELECTRIC LOAD, BUILDING DATA PROCESSING DEVICE, SOCKET MODULE, AND ELECTRIC STAIRWELL INSTALLATION

BACKGROUND AND SUMMARY OF THE INVENTION

Exemplary embodiments of the present invention relate to a circuit assembly for the switched-mode power supply of an electric auxiliary device installed at the installation site of a connected electric load, as well as to a building data processing device.

Relevant documents in this field are DE 20 2021 101 687 U1 and DE 20 2017 005 523 U1.

DE 20 2017 005 523 U1 discloses a home communication system for multi-story buildings with temporarily activatable electric loads in communal systems. At least one communication module is mounted in or on a temporarily activatable electric load of an existing communal system on any floor. In addition, a switch element is provided for further temporary activation of at least one electric load. This is connected to the power supply of the communication module in such a way that a permanent power supply to the communication module is provided by permanently switching on the circuit for the electric loads carrying the communication module while maintaining the original switchability of the electric load over the entire circuit. Specifically, FIGS. 3-5 show an auxiliary device for switching a load, with components designed as top-hat rails.

DE 20 2021 101 687 U1 shows a mechanical assembly consisting of a socket module for wall and ceiling lights. The focus here is primarily on the mechanical and electronic interface of the individual modules.

Data processing devices for building automation are generally known from the prior art; for example, the use of digital control units and interface modules for mounting on standardized DIN rails in electrical distribution boards is common. As a rule, a central control computer with a data processing unit and interfaces to a wide area network (e.g., Internet) is used in combination with one or more application-specific modules with interfaces to the building-specific systems. These systems are usually supplied with electricity via an integrated mains connection (e.g., 230 Vac) or via a DC voltage connection (e.g., 24 V). In most cases, the necessary infrastructure for installation and power supply is available in a building in prominent locations, such as utility rooms.

Data processing devices integrated into luminaire systems which, in addition to the installation site, also use the existing power connections of the luminaires and are also supplied with electrical energy via these, also correspond to prior art. Modern LED luminaire systems already have integrated, sensor-supported data processing units that use the luminaire's power supply. In these cases, the luminaires usually contain programmable microprocessor-based components which, for example, also include status variables such as the presence of people or the ambient brightness in the decision-making process for switching the light on/off.

However, the systems described reach their limits when a data processing device that is dependent on a permanent supply of electrical energy is to be retrofitted at the installation site of an electric load whose circuit is switched via an external switch. For example, a luminaire that is to be extended by a data processing device that requires a permanent power supply can only be switched on and off via a switch with relatively great technical effort. A known utility model describes a technical solution for this purpose in which a switch and the associated load are operated in two separate circuits (see DE 20 2017 005 523). A switching signal, which is detected with the aid of a sensor in a first circuit, is forwarded to the luminaire in a second circuit in the form of a switching command and then leads to a corresponding switching action within the luminaire.

A further problem is posed by interconnected electric load systems, such as lighting systems operated in groups and connected in parallel in the stairwells of buildings. If, in such cases, only individual luminaires are to be equipped with additional data processing devices to be permanently supplied, there are currently no practicable solutions that allow the remaining luminaires in the same group to continue to be switched on and off via an existing light switch. As a rule, in such cases all the luminaires in a group have to be replaced with new, automatically functioning luminaires that are permanently connected to a power supply, which can be very costly. In addition, every lighting and data processing system that is permanently connected to a power supply consumes a small amount of energy, even when it is ready for operation, which can add up to a considerable amount for the entire group.

Typical problems in the design and structural implementation of data processing units distributed throughout a building therefore arise when implementing a reliable supply of electrical energy to individual components. Certain technical building systems, sensors, or even actuators are often installed in remote, hard-to-reach locations within a building. So-called data collector and repeater components are generally used to transport system, sensor, or actuator data, which have to be installed at different locations in the buildings concerned. Due to a lack of alternatives, these components are usually supplied with electrical energy either by batteries or by power cables installed specifically for this purpose. The installation of these devices and possible cable connections is relatively expensive and their operation requires considerable maintenance, for example to replace batteries or repair damage caused by vandalism.

As a result, it can be seen that although the generic data processing devices for control and automation purposes in buildings, which are assumed to be familiar, are tried and tested, technologically versatile and functional, they are in need of improvement, particularly with regard to future requirements for the decentralized use of increasingly powerful components, their inexpensive installation, their permanent and economical supply of electrical energy, their maintainability and ease of repair.

Exemplary embodiments of the present invention are accordingly directed to, taking into account the preceding explanations, further develop existing electrical infrastructures, such as power cables and switch elements in the circuits of lighting systems, with the addition of new components in such a way that an electric auxiliary device to be installed at the location of the respective load can be retrofitted with comparatively little effort and permanently supplied with electrical energy.

In addition, the invention can be used in particular to create the mechanical and electrical prerequisites for enabling the installation of a modern building data processing device as part of a digitization measure based on existing cable, lighting, or bell infrastructures. Personnel trained in electrical engineering will be able to install, operate and repair new information technology components easily and reliably at advantageous locations in the building.

In an advantageous way according to the invention, it has been found that it is an ideal way to install building data processing devices at locations of connected electric loads in buildings and to supply them there permanently with electrical energy, preferably via at least two individual components that can be combined with each other and are electrically compatible with each other, which decisively supplement existing circuits.

Based on the prior art, i.e., a data processing device installed on a load, which is usually only supplied with uninterrupted electrical energy by removing the switch element together with the load, the invention makes it easy to implement a functionally separate power supply for the data processing device and the load by simply adding two additional components. While the load continues to be switched on and off by the switch that remains in the circuit, resulting in negligible electrical losses when the device is ready for operation, the data processing device is permanently supplied with electrical energy regardless of the switch position.

For further explanation, a circuit assumed to be present initially has a voltage source, a switch element and one or more loads that are temporarily switched on/off via a switch.

The new circuit assembly for the permanent power supply of an electric auxiliary device installed at the location of the load has a first bridge component that is attached to the installation site of the switch element, is connected in parallel with it and bridges it periodically so that the current flow is switched on and off cyclically. In the case of an AC circuit, the bridge component can take the form of a diode, for example. The diode conducts the current flow periodically for positive source voltages and blocks it for the duration of negative voltages. The parallel connection of the bridge component and switch creates an electrical functional element that has two states. It conducts the current flow either continuously (switch closed) or only cyclically (switch open).

In a particularly advantageous way, a new switch element can already be equipped with a bridge component that has the properties of the functional element described above and can therefore be inserted even more easily into the new circuit assembly as a single component.

In addition to the diode described, the bridge component can also include other electrical components, such as transistors, which do not make the current flow dependent on the direction of the current, but release it periodically, for example with the aid of a time control, for the specific period of a given period and block it for the remainder of the period.

The circuit assembly also has a second support component, which is usually installed at the installation site of the electric load. The support component also has an electrically conductive element that conducts the current flow periodically, wherein its switching behavior is inverse to that of the bridge component. The support component conducts the current flow in the periods in which the bridge component blocks the current flow, and it blocks the current flow in the periods in which the bridge component switches the current flow through. In addition to this, the support component also has an electrical storage element that absorbs a certain amount of energy in the event of a current flow and releases this amount of energy to a downstream load during the current interruption.

In the case of an AC circuit, the support component can be constructed using a diode and a capacitor, for example. The diode will block the current flow for the duration of positive voltages and pass it through for the duration of negative voltages. The capacitor absorbs new charge when the current flows and passes the stored charge on to the load when the current is interrupted.

The bridge component and the load component therefore have complementary properties which, when combined, have the following effect in the supplemented circuit:

a.) When the switch is open, the bridge component periodically restricts the current flow for a certain period of time, during which the load component blocks the current flow. Conversely, the bridge component interrupts the current flow cyclically for the remainder of the relevant period, while the support component then switches to the conducting state. As a result, the current flow through the load in a series connection of bridge element and carrier element is permanently interrupted when the switch is open.

b.) When the switch is closed, the state of the bridge component is irrelevant. The function of the series connection of bridge component and support component is determined solely by the state of the support component. This closes the circuit cyclically for a limited duration within a period and then also charges the integrated storage element, which releases its charge to the downstream load when the circuit is closed. As a result, the current flow through the load is either periodic (low capacity) or continuous (high capacity), depending on the capacity of the storage element and the electric load of the consumer.

c.) An electric auxiliary device arranged upstream of the support component is periodically supplied with power via the bridge component, even when the switch is open. Thus, if the auxiliary device itself has a storage element that carries the current flow for the duration of the interruption by the bridge element, an uninterrupted power supply to the auxiliary device can be ensured.

The bridge component has an electrical interface with at least two contacts, via which it is connected in parallel to an electrical switch element. The component can advantageously be designed as a top-hat rail module that is mounted on a DIN rail next to a stairwell lighting unit and is electrically connected to the unit in such a way that it bridges the switch element of the unit. In another embodiment, the bridge component can also be housed in the installation box of a light switch as a flush-mounted module, for example, and electrically bridge the switch element there.

The support component has an electrical interface with at least three contacts. These contacts are used to connect the power supply and a possible auxiliary device on the one hand and the power supply to the load on the other. Depending on the particular application, this component can be designed as a separate ballast for an existing load or as a new integral part of a load. For the use of a support component in a lighting system, the component can advantageously be designed as a separate socket module between a wall/ceiling and a wall/ceiling luminaire. In this application, the power cables from the wall/ceiling on the one hand and the luminaire on the other are connected to this module.

In the context of the present invention, the electric auxiliary device, the circuit including the switched electric load and/or the switch element are merely optional components of the circuit assembly according to the invention.

Particularly advantageous embodiments of the support component are support components integrated into a load or an auxiliary device. For example, a support component can be integrated into an LED lamp in the future, which is characterized in that it only functions in a certain current direction in a circuit comparable to an LED. The shape of such a device does not differ from the lamp shapes known today. As before, the device can simply be screwed or plugged into the receiving devices provided for it.

Another advantageous embodiment is represented by auxiliary devices, such as data processing devices of a building data processing system, which are mounted at the location of a luminaire between the wall/ceiling and a wall/ceiling luminaire. The housing of this application can, for example, correspond to a flat, round, or square base device, which is equipped on one side with a contact point for fastening to a wall or ceiling by means of a screw, rotary or plug-in connection and on the other side with suitable mounting devices for mounting a luminaire. The latter can also be designed as a screw, rotary or plug-in connection. A known utility model describes a particularly advantageous embodiment in which a data processing module is integrated into a luminaire system (see "Data processing module of a modular luminaire system and luminaire system", Beenic Buildings Intelligence GmbH, DE 20 2021 101 687).

BRIEF DESCRIPTION OF THE DRAWING FIGURES

Further advantages, features and details can be seen from the following description of preferred embodiments and from the drawings, which show:

DETAILED DESCRIPTION

Figure 1:
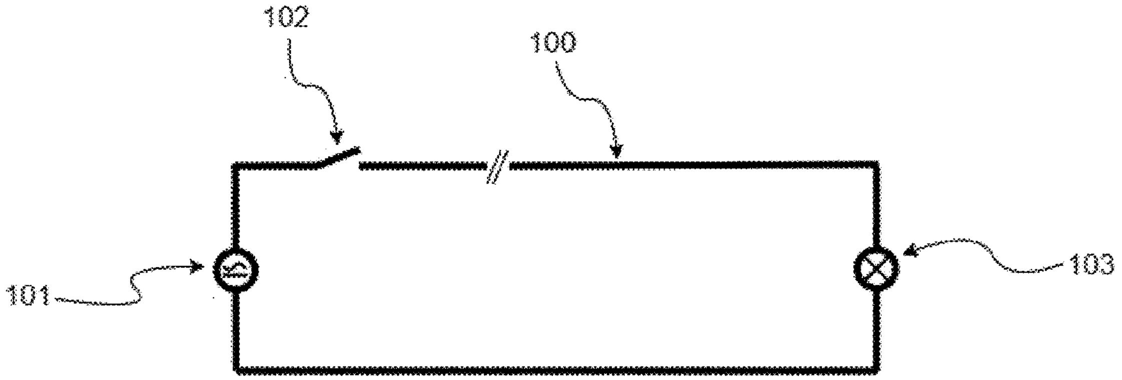
FIG. 1 shows a known view of an ordinary circuit.

FIG. 1 shows an ordinary circuit 100 consisting of a voltage source 101, switch element 102 and load 103.

Figure 2:
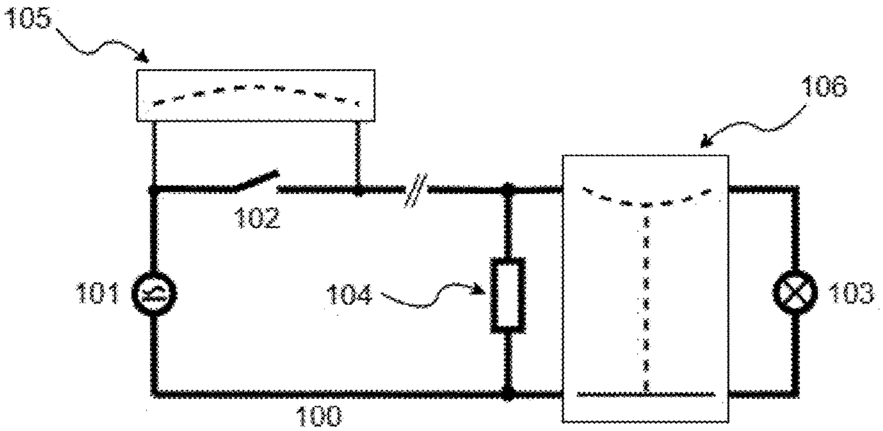
FIG. 2 shows a circuit of FIG. 1 extended by bridge component, support component and auxiliary device.

FIG. 2 shows the circuit shown in FIG. 1 extended by a bridge component 105 and a support component 106 for the switched-mode power supply of an electric auxiliary device 104 and the load 103.

Figure 3:
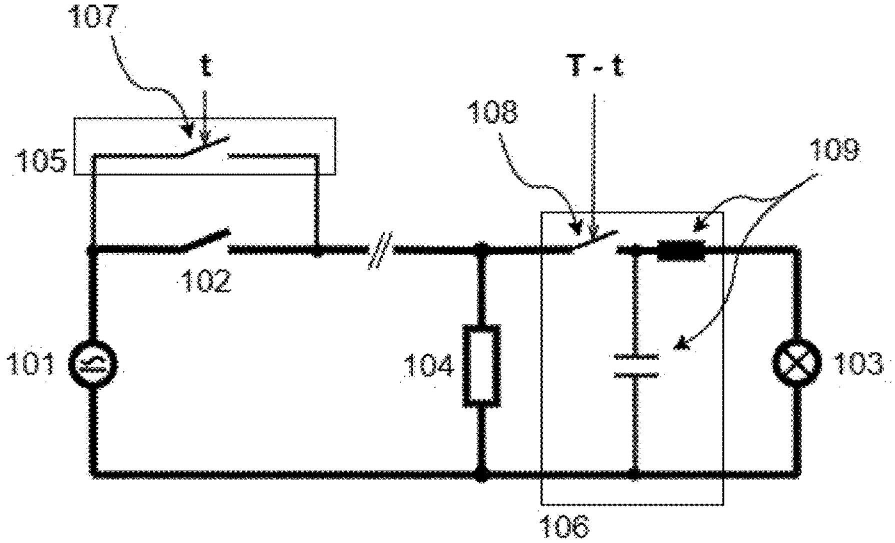
FIG. 3 shows a functional illustration of FIG. 2.

FIG. 3 shows a functional representation of the bridge component 105 and the support component 106 in the circuit of FIG. 2. The bridge component contains a switched-mode switch element 107, which is closed for the duration t within a period T. The support component contains a switched-mode switch element 108, which is closed for the duration T-t within a period, as well as one or more storage elements 109, which are shown as capacitor and inductor by way of example. The auxiliary device 104 is connected to the voltage source 101 continuously when the switch 102 is closed, or switched-mode via the switch element 107 when the switch 102 is open. The load 103 is only connected to the voltage source 101 via the switch element 108 when the switch 102 is closed.

Figure 4:
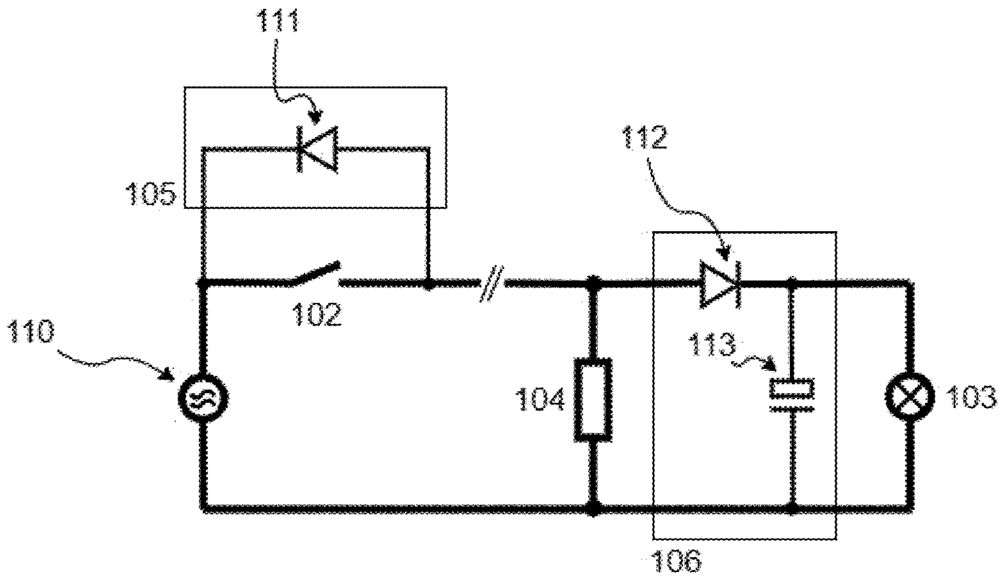
FIG. 4 shows an implementation illustration of FIG. 3 using the example of an AC circuit.

FIG. 4 shows an implementation example of FIG. 3 in an AC circuit. In this case, the switched-mode switch element within the bridge component can be constructed using a diode 111. In this case, the switched-mode switch element within the support component can also be implemented using a diode 112, wherein this is operated in the opposite direction to the diode 111. In this case, the storage element within the support component is implemented as a capacitor 113.

Figure 5:
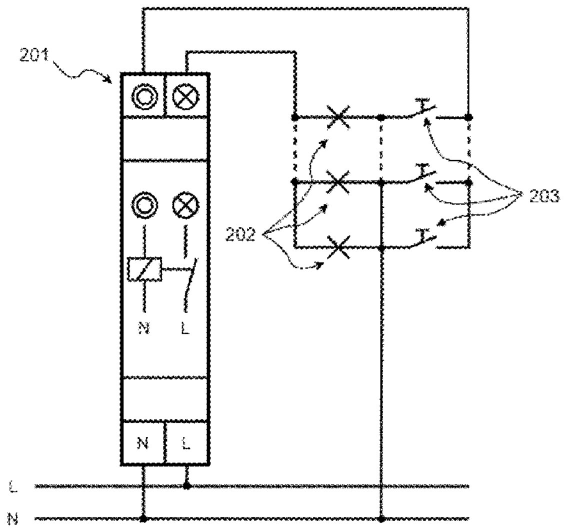
FIG. 5 shows known wiring of common automatic stairwell lighting controller.

FIG. 5 shows the known circuit assembly of a conventional automatic stairwell controller 201. The automatic stairwell controller contains a relay or an electronic switch element which is activated via the push-buttons 203 installed in the stairwell and then switches on the stairwell lights 202 for a predetermined period of time.

Figure 6:
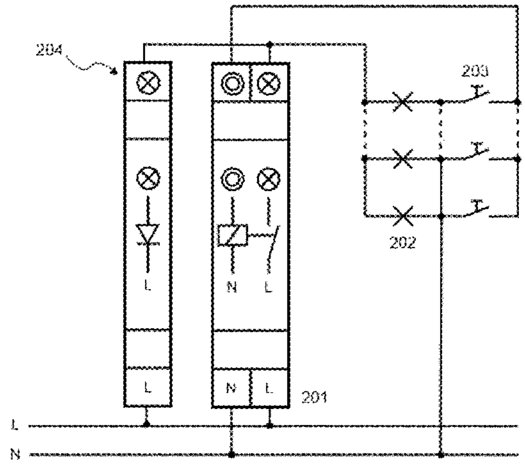
FIG. 6 shows an automatic stairwell lighting controller from FIG. 5 extended by bridge component.

FIG. 6 shows the circuit assembly introduced in FIG. 5 supplemented by a bridge component 204, which is arranged parallel to the switch element of the automatic stairwell lighting controller 201.

Figure 7:
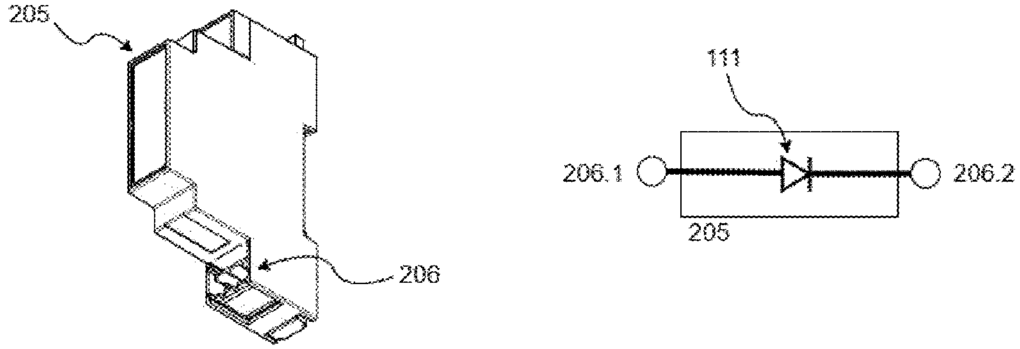
FIG. 7 shows an implementation illustration of the bridge component from FIG. 6 using the example of a top-hat rail module with circuit diagram.

FIG. 7 shows an implementation example of the bridge component 204 shown in FIG. 6 in the form of a top-hat rail module 205 that can be mounted on a DIN rail. This top-hat rail module has one or more electrical interfaces 206 with at least two contacts 206.1 and 206.2. In the example shown, these two contacts are connected to each other via a diode 111.

Figure 8:
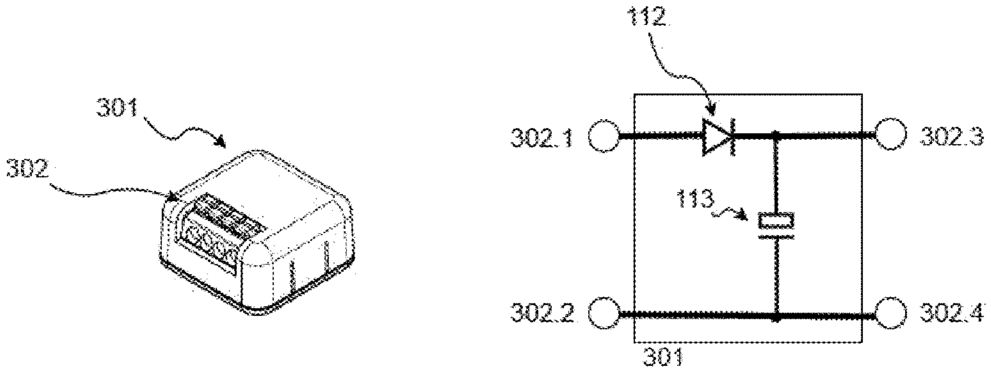
FIG. 8 shows an example implementation of separate support component with circuit diagram.

FIG. 8 shows an implementation example of a support component introduced in FIG. 4 in the form of a compact ballast having at least one electrical interface, which has a total of at least three, in this specific case four, contacts. Inside this device there is a diode 112, which is connected between the two contacts 302.1 and 302.3, and a capacitor 113, which is connected to the contacts 302.3 and 302.2/302.4. In accordance with the circuit shown in FIG. 4, the device shown is generally used as a ballast for an electric load 103, which is only to be activated when the switch 102 is closed.

Figure 9:
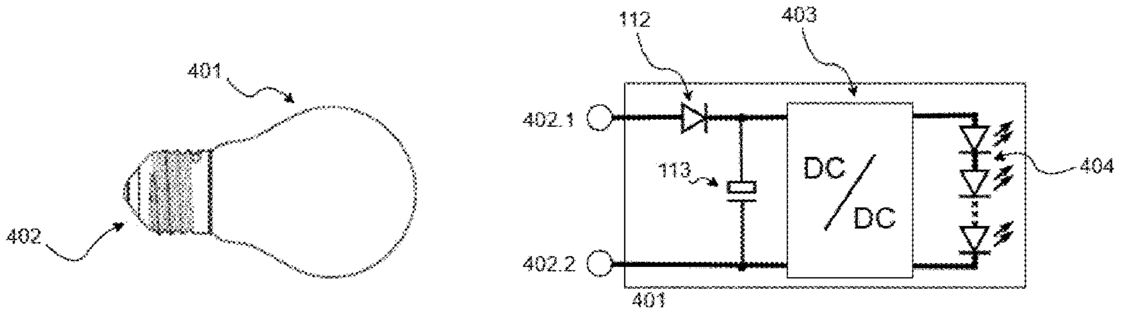
FIG. 9 shows an example implementation of an integrated support component in an LED lamp with circuit diagram

FIG. 9 shows an LED lamp 401 in which the support component introduced in FIG. 4, consisting of the diode 112 and the capacitor 113, is integrated. The lamp also has a rotary or plug-in connector with an electrical interface 402 with two electrical contacts as well as a DC/DC converter 403 and an LED array 404. In contrast to an ordinary LED lamp, which is usually equipped with a bridge rectifier, the LED lamp shown has only a single rectifier diode 112. As a result, this LED lamp can only be switched on when the source voltage has the correct polarity. This property, which is actually a disadvantage for an ordinary LED lamp, represents a decisive advantage for the circuit assembly of the invention. An existing lamp, which is already installed as a load in an existing circuit, can very easily be retrofitted with the new LED lamp 401 in order to function in accordance with the invention, for example in the luminaire group of a stairwell lighting system, which is equipped with new data processing devices at individual points.

Figure 10:
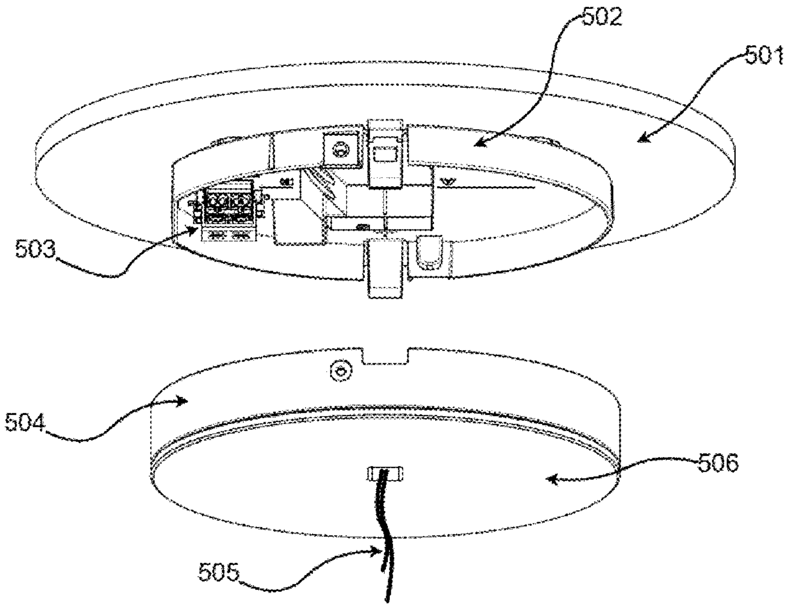
FIG. 10 shows an implementation illustration of a separate support component using the example of a socket module for a wall/ceiling luminaire.

FIG. 10 shows a perspective view of an implementation example of the support component introduced in FIG. 2 in the form of a socket module 504 for mounting a ceiling or wall light. In the case presented, the socket module is attached to a wall/ceiling mount 502, which is mounted on a wall/ceiling 501. The mount has an electrical interface 503, which has at least two electrical contacts to which the power supply lines of the light are connected. The socket module has a housing cover 506, which also serves to attach a commercially available wall/ceiling light, which in the case presented can be mounted on this cover by means of a screw connection. The electrical interfaces of the socket module are shown in FIG. 11.

Figure 11:
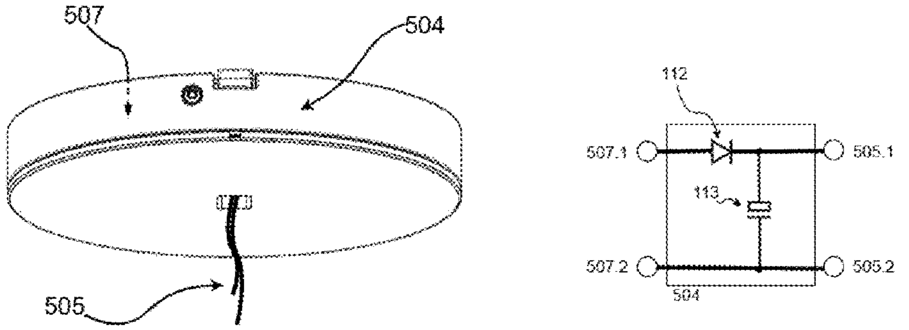
FIG. 11 shows a socket module from FIG. 10 with circuit diagram.

FIG. 11 shows the two electrical interfaces of the socket module used as a support component as well as a circuit diagram. On the input side, the module contains an electrical interface 507, which in the case presented is designed to be compatible with the interface 503 of the mount in FIG. 10 and has at least two electrical contacts 507.1 and 507.2. In addition, the module contains an electrical interface 505 on the output side, which also has two contacts 505.1 and 505.2 and, in the case presented, is designed with two cable connections.

Figure 12:
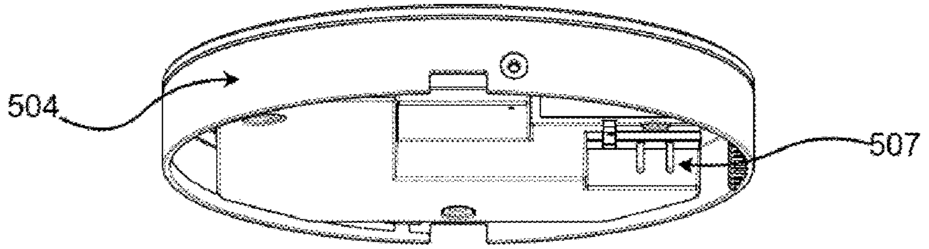
FIG. 12 shows a rear view of socket module from FIG. 10 and FIG. 11.

FIG. 12 shows a rear view of the socket module 504 of FIG. 10 and FIG. 11. In this view, the two contact pins 507 are recognizable, which are designed to be compatible with the electrical interface of the wall/ceiling mount 503 in FIG. 10.

Figure 13:
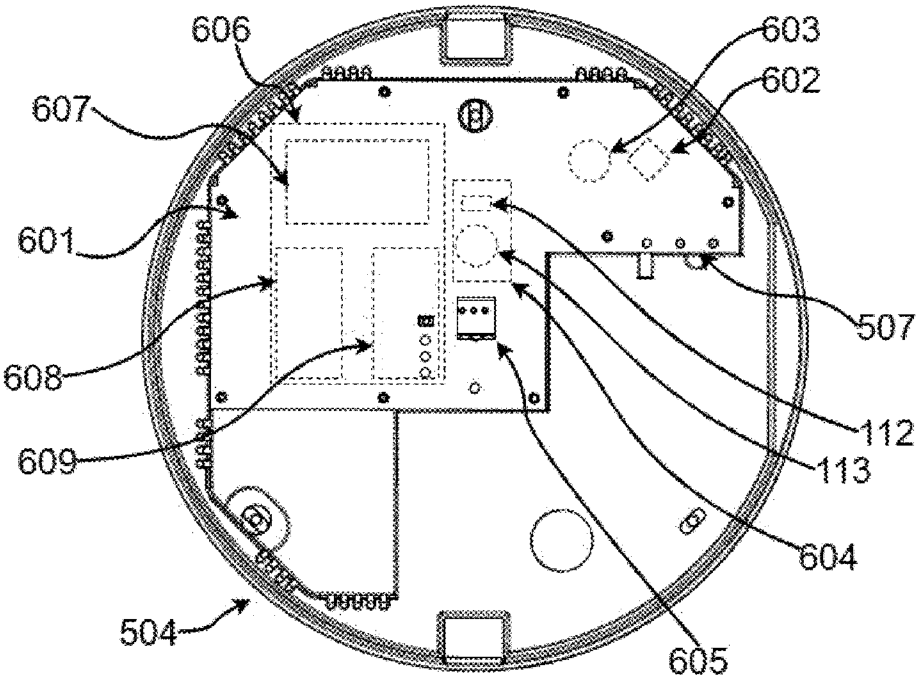
FIG. 13 shows an implementation illustration of an integrated support component using the example of a building data processing device integrated into a base according to FIG. 10.

FIG. 13 shows the interior view of a socket module 504 with integrated support component 604, which is also equipped with the functional elements of a building data processing device as an auxiliary device 104 (see FIG. 4), with the cover open. The support component with the diode 112 and the capacitor 113 as well as the electrical interface 507 for contacting the power supply and the electrical interface 605 for contacting a connected load are located on a common printed circuit board 601. On the other hand, an AC/DC converter is located on the printed circuit board as an electrical power supply for the circuit part of the data processing unit 606. This AC/DC converter generally has a bridge rectifier 602 and a capacitor 603 connected thereto. The circuit part of the data processing unit generally has one or more DC/DC converters 607, a control unit with microprocessor 608 and input/output elements 609 connected thereto.

Figure 14:
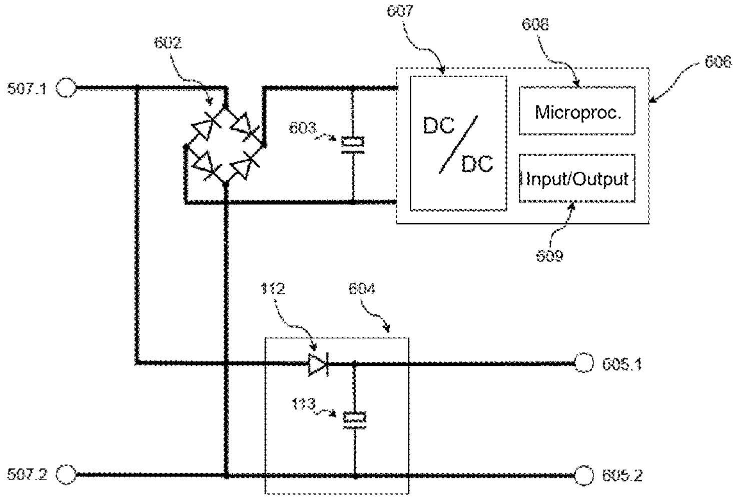
FIG. 14 shows a block diagram of the building data processing unit from FIG. 13.

FIG. 14 shows a block diagram of the circuit components relevant for the power supply of the building data processing device and a load connected to it. Via the two electrical contacts 507.1 and 507.1 of the power supply interface 507, both the data processing device and a downstream electric load, which is connected via the two electrical contacts 605.1 and 605.2, are supplied with power. The integrated support component 604 takes over the switched-mode power supply of the load. The data processing unit 606, consisting of DC/DC power supply block 607, microprocessor 608 and input/output elements 609, is connected directly to the power supply interface via the rectifier bridge 602 and the capacitor 603.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

100 Ordinary circuit
101 Voltage source
102 Switch element
103 Load (example: luminaire)
104 Electric auxiliary device
105 Bridge component
106 Support component
107 Periodically closing switch within the bridge component (duty cycle t; t<T: period duration)
108 Periodically closing switch within the support component (duty cycle T-t)
109 Electrical storage element (examples: capacitor, inductor)
110 AC voltage source
111 Diode within the bridge component
112 Diode within the support component
113 Capacitor within the support component
201 Automatic stairwell lighting controller
202 Stairwell light(s)
203 Light switch in the stairwell
204 Bridge component in the stairwell lighting application
205 Bridge component as top-hat rail module
206 Electrical interface of the bridge component of top-hat rail module
301 Support component in modular form
302 Electrical interface of the support component in modular form
401 LED lamp (example: E27 base)
402 Electrical interface LED lamp
403 DC/DC converter block within LED lamp
404 LED array within LED lamp
501 Wall or ceiling
502 Wall or ceiling mount
503 Electrical interface within the wall/ceiling bracket
504 Socket module for luminaire mounting
505 Electrical interface for connecting a luminaire
506 Base cover for luminaire mounting
507 Electrical interface within the socket module (power supply)
601 Printed circuit board
602 Bridge rectifier
603 Capacitor within the power supply of data processing device
604 Support component within a data processing device
605 Electrical interface for connecting a luminaire
606 Circuit section of data processing unit
607 DC/DC converter within the data processing unit
608 Microprocessor within the data processing unit
609 Input/output elements within the data processing unit

The invention claimed is:

1. A circuit assembly for switched-mode power supply of an electric auxiliary device at a site of a connected electric load which is located in a circuit in which a switch element switches an operating state of a load with low loss, while the auxiliary device is continuously supplied with electrical energy, the circuit assembly comprising:
- at least one bridge component arranged in parallel circuit with respect to the switch element;
- at least one support component connected upstream of the electric load such that the electric load is supplied with power as a function of a switch position of the switch element; and
- at least one auxiliary device, arranged between the at least one bridge component and the at least one support component, configured so that the at least one auxiliary device is supplied with power without interruption regardless of the switch position of the switch element,
- wherein the at least one bridge component has at least one cyclically conductive switch element and the at least one support component has at least one anti-cyclically conductive switch element and a storage element.

2. The circuit assembly of claim 1, wherein
- the at least one bridge component has a diode and the at least one support component has a diode and a capacitor,
- forward directions of the diodes of the at least one bridge component and the at least one support component in the circuit assembly are arranged opposite one another,
- the capacitor in the circuit assembly is configured to absorb electrical charge for a period of time during which the diode of the at least one support component conducts current flow and to output the absorbed electrical charge to a downstream load, and
- the diode of the at least one support component is configured to conduct the current flow and to release the absorbed electrical charge to the downstream load when the diode of the at least one support component interrupts the current flow.

3. The circuit assembly of claim 1, wherein the at least one bridge component is part of a circuit of a stairwell lighting installation in a building and is configured to bridge the switch element of an automatic stairwell lighting controller.

4. The circuit assembly of claim 1, wherein the at least one support component is part of a circuit of an automatic stairwell lighting controller in a building that also has stairwell luminaires, wherein the at least one support component is configured as a ballast upstream of the stairwell luminaires, so that the stairwell luminaires are switchable via an automatic stairwell controller even after installation of the at least one bridge component.

5. The circuit assembly of claim 1, wherein the at least one bridge component is a top-hat rail module.

6. The circuit assembly of claim 1, wherein the at least one bridge component is integrated into the switch element.

7. The circuit assembly of claim 1, wherein the at least one support component is integrated into an LED lamp.

8. The circuit assembly of claim 1, wherein the at least one support component is configured as part of a socket module of a luminaire.

9. The circuit assembly claim 1, wherein the at least one auxiliary device is a building data processing device.

10. A socket module, comprising:
- a circuit assembly for switched-mode power supply of an electric auxiliary device at a site of a connected electric load which is located in a circuit in which a switch element switches an operating state of a load with low loss, while the auxiliary device is continuously supplied with electrical energy, the circuit assembly comprising
  - at least one bridge component arranged in parallel circuit with respect to the switch element;
  - at least one support component connected upstream of the electric load such that the electric load is supplied with power as a function of a switch position of the switch element; and
  - at least one auxiliary device, arranged between the at least one bridge component and the at least one support component, configured so that the at least one auxiliary device is supplied with power without interruption regardless of the switch position of the switch element,
  - wherein the at least one bridge component has at least one cyclically conductive switch element and the at least one support component has at least one anti-cyclically conductive switch element and a storage element, and
- wherein the socket module has two mechanical interfaces configured so that the socket module is arrangeable between a wall or ceiling and a wall or ceiling luminaire.

11. The socket module of claim 10, wherein the socket module further comprises:
- at least one electrical power supply interface, via which electrical power is supplied to the circuit assembly; and
- at least one electrical interface, via which a downstream luminaire is electrically connected.

12. An electrical stairwell installation, comprising:
- a circuit; and
- a circuit assembly for switched-mode power supply of an electric auxiliary device at a site of a connected electric load which is located in the circuit in which a switch element switches an operating state of a load with low loss, while the auxiliary device is continuously supplied with electrical energy, the circuit assembly comprising
  - at least one bridge component arranged in parallel circuit with respect to the switch element;
  - at least one support component connected upstream of the electric load such that the electric load is supplied with power as a function of a switch position of the switch element; and
  - at least one auxiliary device, arranged between the at least one bridge component and the at least one support component, configured so that the at least one auxiliary device is supplied with power without interruption regardless of the switch position of the switch element,
  - wherein the at least one bridge component has at least one cyclically conductive switch element and the at least one support component has at least one anti-cyclically conductive switch element and a storage element.

13. The circuit assembly of claim 1, wherein the at least one bridge component and the at least one support component are arranged in series.

14. The socket module of claim 10, wherein the at least one bridge component and the at least one support component are arranged in series.

15. The electrical stairwell installation of claim 12, wherein the at least one bridge component and the at least one support component are arranged in series.

16. The socket module of claim 10, wherein the at least one bridge component has a diode and the at least one support component has a diode and a capacitor, forward directions of the diodes of the at least one bridge component and the at least one support component in the circuit assembly are arranged opposite one another, the capacitor in the circuit assembly is configured to absorb electrical charge for a period of time during which the diode of the at least one support component conducts current flow and to output the absorbed electrical charge to a downstream load, and the diode of the at least one support component is configured to conduct the current flow and to release the absorbed electrical charge to the downstream load when the diode of the at least one support component interrupts the current flow.

17. The electrical stairwell installation of claim 12, wherein the at least one bridge component has a diode and the at least one support component has a diode and a capacitor, forward directions of the diodes of the at least one bridge component and the at least one support component in the circuit assembly are arranged opposite one another, the capacitor in the circuit assembly is configured to absorb electrical charge for a period of time during which the diode of the at least one support component conducts current flow and to output the absorbed electrical charge to a downstream load, and the diode of the at least one support component is configured to conduct the current flow and to release the absorbed electrical charge to the downstream load when the diode of the at least one support component interrupts the current flow.

* * * * *